(12) United States Patent
Tranier et al.

(10) Patent No.: US 8,252,089 B2
(45) Date of Patent: Aug. 28, 2012

(54) METHOD AND DEVICE FOR DRYING A GAS FLOW RICH IN CARBON DIOXIDE

(75) Inventors: Jean-Pierre Tranier, L'Hay-les-Roses (FR); Arthur Darde, Paris (FR); Jean-François Rauch, Joinville-le-Pont (FR); Dominique Antonio, Moissy-Cramayel (FR); Christophe Michel, Houilles (FR)

(73) Assignee: L'Air Liquide Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 168 days.

(21) Appl. No.: 12/744,109

(22) PCT Filed: Nov. 21, 2008

(86) PCT No.: PCT/FR2008/052103
§ 371 (c)(1),
(2), (4) Date: Jul. 21, 2010

(87) PCT Pub. No.: WO2009/071816
PCT Pub. Date: Jun. 11, 2009

(65) Prior Publication Data
US 2010/0288121 A1    Nov. 18, 2010

(30) Foreign Application Priority Data
Nov. 30, 2007  (FR) ..................... 07 59441

(51) Int. Cl.
*B01D 53/02*    (2006.01)

(52) U.S. Cl. .......... 95/117; 95/41; 95/114; 95/115; 96/121; 96/122; 96/126; 96/127; 96/128; 96/130

(58) Field of Classification Search ........... 95/41, 114, 95/115, 117; 96/121, 122, 126, 127, 128, 96/130
See application file for complete search history.

(56) References Cited

U.S. PATENT DOCUMENTS

| | | | | |
|---|---|---|---|---|
| 4,283,212 A * | 8/1981 | Graham et al. | ................ | 62/636 |
| 4,380,457 A * | 4/1983 | Rathborne et al. | ............. | 95/114 |
| 4,405,343 A | 9/1983 | Othmer | | |
| 4,898,599 A * | 2/1990 | Settlemyer | ...................... | 95/92 |
| 5,914,455 A * | 6/1999 | Jain et al. | ......................... | 95/96 |
| 6,106,593 A * | 8/2000 | Golden et al. | ................. | 95/120 |
| 6,221,130 B1 * | 4/2001 | Kolodziej et al. | ................ | 95/41 |
| 6,226,888 B1 * | 5/2001 | Lang | ............................ | 34/332 |
| 6,375,722 B1 * | 4/2002 | Henderson et al. | ............ | 96/112 |
| 6,767,390 B2 * | 7/2004 | Battershell et al. | ............ | 96/111 |
| 7,279,026 B1 * | 10/2007 | Fresch et al. | .................... | 95/124 |

(Continued)

FOREIGN PATENT DOCUMENTS

DE  19600377  6/1997

(Continued)

OTHER PUBLICATIONS

PCT Search Report for PCT/FR2008/052103.

*Primary Examiner* — Robert J Hill, Jr.
*Assistant Examiner* — Christopher P Jones
(74) *Attorney, Agent, or Firm* — Elwood L. Haynes

(57) ABSTRACT

The present invention relates to a method and device for compressing and drying a gas flow rich in carbon dioxide, for example containing more than 50 mol % of carbon dioxide.

3 Claims, 1 Drawing Sheet

U.S. PATENT DOCUMENTS

| | | |
|---|---|---|
| 7,452,406 B2 * | 11/2008 | Little et al. ......................... 95/97 |
| 7,691,183 B2 * | 4/2010 | Vertriest ........................... 95/119 |
| 2004/0045434 A1 * | 3/2004 | Golden et al. ..................... 95/96 |
| 2007/0028772 A1 | 2/2007 | Jain et al. |
| 2008/0202337 A1 * | 8/2008 | Taylor et al. ..................... 95/101 |
| 2009/0049984 A1 * | 2/2009 | Vertriest ........................... 95/41 |

FOREIGN PATENT DOCUMENTS

| | | |
|---|---|---|
| FR | 2530965 | 2/1984 |
| GB | 2203965 | 11/1988 |

* cited by examiner

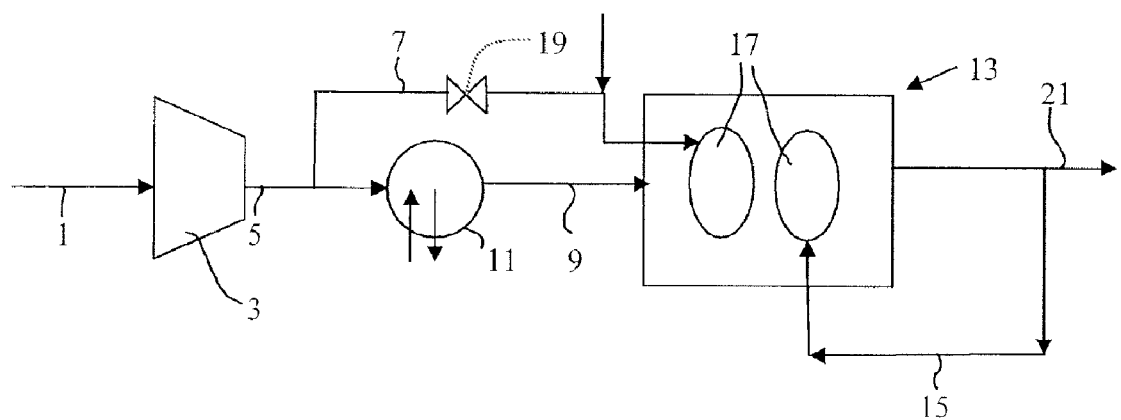

METHOD AND DEVICE FOR DRYING A GAS FLOW RICH IN CARBON DIOXIDE

This application is a §371 of International PCT Application PCT/FR2008/052103, filed Nov. 21, 2008.

Field of the Invention

The present invention relates to a method and device for compressing and drying a gas flow rich in carbon dioxide, for example containing more than 50 mol % of carbon dioxide.

Background

US-A-200760028772 describes a method according to the preamble of claim 1.

Combustion fumes are charged with carbon dioxide and other acidic gases ($NO_x$, $SO_x$) and are decidedly moist. When oxycombustion is involved, the $CO_2$ concentration easily reaches 80% by volume.

This presents a problem during the first pressurization of adsorption bottles provided for drying the fumes. These fumes, under pressure (typically 30 bar), will be expanded in bottles that are at atmospheric pressure. Expansion of $CO_2$ will lead to considerable cooling, distinctly below 0° C. The phenomenon could lead to the creation of ice crystals that would damage the equipment and adsorbents.

SUMMARY OF THE INVENTION

The invention consists of pressurizing bottles with hot gas, for example $CO_2$, in order to avoid the problem mentioned above.

According to one object of the invention, a method is provided.

Optionally, part of the gas rich in carbon dioxide compressed in the compressor taken upstream of the cooler, expands in the bottle to a temperature above 0° C.

According to another object of the invention, a device is provided for a gas rich in carbon dioxide at a high pressure, comprising a unit for drying by adsorption for drying the gas rich in carbon dioxide comprising at least two bottles of adsorbent operating in a cycle in which one bottle is supplied with gas rich in carbon dioxide for drying whilst another bottle is pressurized and regenerated by a flow of dry gas produced by the drying unit, the drying unit producing at least one dry gas rich in carbon dioxide, characterized in that it includes means for conveying to a bottle a gas under pressure other than a product from the drying unit and as the case may be drier than the gas.

Within this context, one possibility is that of not cooling the fumes sufficiently while using a circuit for diverting cooling water around the final cooler for example. This type of solution runs the risk of not being reliable enough since the cooling water flows are not generally well controlled.

The proposed solution consists of drawing off a small $CO_2$ line at the outlet from the compressor, tapped off before the final cooler, which makes it possible to pressurize the drying bottles.

It should be noted that once the bottles are pressurized, the problem is no longer presented for the following cycles. Indeed, it is then possible to repressurize the bottles with dry $CO_2$ at the adsorption pressure.

BRIEF DESCRIPTION OF THE FIGURES

The sole FIGURE illustrates one embodiment of the present invention.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention will be described in greater detail with reference to the figure that represents a device according to the invention.

A gas rich in carbon dioxide contains water and other impurities such as oxygen, nitrogen, argon, acidic gases ($NO_x$, $SO_x$) etc. In order to be able to purify the gas by a subsequent distillation step, it is necessary first of all to dry it.

The gas 1 is compressed starting from 1 bar in a compressor 3 made of stainless steel to produce a compressed gas 5 at between 3 and 45 bar, for example approximately 30 bar. The compressor 3 is connected to the drying device 13 by a pipeline 9 through a cooling device 11 and through a pipeline 7 without a cooling device.

The drying device 13 operates in a known manner with a cycle in which one of the bottles 17 serves to purify the gas while the other is regenerated by a regenerating gas, in this case part 15 of the dry gas 21.

In normal operation, all the gas 5 is conveyed to the pipeline 9, cooled by the cooling device 11 and dried in the drying device 13 to produce a dry gas 21 at 30 bar, of which part 15 is recycled to one of the bottles to be pressurized.

During the first pressurization of the bottles that occurs at the start up, the dry gas 15 is not available. Thus, according to the invention, at least part of the gas 5 is diverted towards the pipeline 7 through the open valve 19 to arrive at a bottle 17 of the drying device at the outlet temperature of the last stage of the compressor 3 and at a pressure similar to the pressure at the outlet from the compressor 3. The flow in pipeline 7 is at a higher temperature than the inlet temperature of the gas 9 in the adsorption unit. In this way, this flow in pipeline 7 may pressurize the bottle 17 to the required pressure solely for starting the device, without risk of forming ice while being expanded from between 3 and 45bar abs to approximately atmospheric pressure in the non-pressurized bottle 17.

What is claimed is:

1. A method for compressing and drying a gas rich in carbon dioxide, comprising
   compressing the gas to produce a gas rich in carbon dioxide at a high pressure rich in carbon dioxide in a compressor,
   cooling the gas at a high pressure in a cooler to form a cooled gas,
   purifying the gas rich in carbon dioxide in a unit for drying by adsorption comprising;
      at least two bottles of adsorbent operating in a cycle in which one bottle is supplied with gas rich in carbon dioxide for drying whilst another bottle is pressurized and regenerated by a flow of dry gas produced by the drying unit,
      the drying unit producing at least one dry gas rich in carbon dioxide, wherein only during the first pressurization of at least one bottle, at start up, a part of the gas rich in carbon dioxide compressed in the compressor, taken upstream of the cooler and hotter than the cooled gas at the inlet to the drying unit is conveyed to the bottle to pressurize it.

2. The method of claim 1 wherein the part of the gas rich in carbon dioxide conveyed to the bottle during the first pressurization expands therein to a temperature above 0° C.

3. A device for compressing and drying a gas rich in carbon dioxide at a high pressure comprising;
- a compressor in which the gas rich in carbon dioxide is compressed,
- a cooler in which the gas rich in carbon dioxide, compressed in the compressor and before the cooler, is cooled,
- a unit for drying by adsorption for drying the gas rich in carbon dioxide comprising;
  - at least two bottles of adsorbent comprising means for supplying the bottles with gas rich in carbon dioxide to be dried,
  - means for pressurizing and regenerating the bottles by a flow of dry gas produced by the drying unit, and
  - means for extracting at least one dry gas rich in carbon dioxide, characterized in that it includes means for conveying to a bottle a gas under pressure consisting of part of the gas rich in carbon dioxide compressed in the compressor, taken upstream of the cooler to the bottles of the drying unit.

* * * * *